(12) United States Patent
Fraysse et al.

(10) Patent No.: US 12,719,176 B2
(45) Date of Patent: Aug. 25, 2026

(54) QUASI-OPTICAL BEAMFORMER COMPRISING TWO REFLECTORS

(71) Applicants: THALES, Meudon (FR); CENTRE NATIONAL D'ETUDES SPATIALES, Paris (FR); CENTRE NATIONAL DE LA RECHERCHE SCIENTIFIQUE, Paris (FR); UNIVERSITE DE RENNES, Rennes (FR); NANTES UNIVERSITE, Nantes (FR); CENTRALESUPELEC, Gif sur Yvette Cedex (FR); INSA DE RENNES, Rennes Cedex (FR)

(72) Inventors: Jean-Philippe Fraysse, Toulouse (FR); Léonin Lassauce, Epinal (FR); Ségolène Tubau, Toulouse (FR); Mauro Ettorre, Rennes (FR); Hervé Legay, Plaisance du Touch (FR)

(73) Assignees: THALES, Meudon (FR); CENTRE NATIONAL D'ETUDES SPATIALES, Paris (FR); CENTRE NATIONAL DE LA RECHERCHE SCIENTIFIQUE, Paris (FR); UNIVERSITE DE RENNES, Rennes (FR); NANTES UNIVERSITE, Nantes (FR); CENTRALESUPELEC, Gif sur Yvette (FR); INSA DE RENNES, Rennes (FR)

( * ) Notice: Subject to any disclaimer, the term of this patent is extended or adjusted under 35 U.S.C. 154(b) by 306 days.

(21) Appl. No.: 18/379,605

(22) Filed: Oct. 12, 2023

(65) Prior Publication Data

US 2024/0128654 A1 Apr. 18, 2024

(30) Foreign Application Priority Data

Oct. 13, 2022 (FR) ...................................... 2210515

(51) Int. Cl.
*H01Q 19/06* (2006.01)
*H01Q 9/04* (2006.01)
(Continued)

(52) U.S. Cl.
CPC ............. *H01Q 19/06* (2013.01); *H01Q 9/045* (2013.01); *H01Q 23/00* (2013.01); *H04B 7/0617* (2013.01)

(58) Field of Classification Search
CPC ........ H01Q 19/06; H01Q 9/045; H01Q 23/00; H01Q 19/191; H01Q 25/008; H01Q 3/245; H04B 7/0617
See application file for complete search history.

(56) References Cited

U.S. PATENT DOCUMENTS

2019/0115658 A1* 4/2019 Iannotti .................. H01P 1/184

FOREIGN PATENT DOCUMENTS

FR 3 057 999 A 4/2018

OTHER PUBLICATIONS

J.-W. Lian, Y.-L. Ban, Z. Chen, B. Fu and C. Xiao, "SIW Folded Cassegrain Lens for Millimeter-Wave Multibeam Application," in IEEE Antennas and Wireless Propagation Letters, vol. 17, No. 4, pp. 583-586, Apr. 2018, doi: 10.1109/LAWP.2018.2804923 (Year: 2018).*

(Continued)

*Primary Examiner* — Resha Desai
*Assistant Examiner* — Naomi M Wolford
(74) *Attorney, Agent, or Firm* — BakerHostetler

(57) ABSTRACT

A quasi-optical beamformer includes a plurality N>1 of power feeds (PF), each of the i∈[1; N] power feeds (PF) being configured to emit a respective radio-frequency beam denoted $R_i$, a radio-frequency transmission line (LT) fed at a first end by the power feeds and comprising at a second end a plurality of network ports (PR) that are configured to (Continued)

collect radio-frequency radiation, the transmission line (LT) comprising a radio-frequency waveguide (GO) that comprises at least two metal plates (PM) that are stacked so as to guide the radio-frequency beams $R_i$, i∈[1; N] towards the network ports (PR), the transmission line (LT) extending along a central main axis denoted axis x, a first reflector (M1) having a first centre (C1) centred on the axis x and a first effective radius of curvature and being configured to reflect the guided radio-frequency beams $R_i$, i∈[1; N], a second reflector (M2) having a second effective radius of curvature and being configured to reflect the radio-frequency beams ($RF_i$) reflected by the first reflector so as to direct them towards the network ports so as to form output radio-frequency beams ($RS_i$), the first and second effective radii of curvature and an arrangement of the power feeds (PF) with respect to the first reflector being configured so that: each of the output radio-frequency beams ($RS_i$) is a plane wave, and a transverse amplitude distribution $A_i$, on the network ports (PR), of each output radio-frequency beam ($RS_i$), is substantially identical.

14 Claims, 9 Drawing Sheets

(51) Int. Cl.
*H01Q 23/00* (2006.01)
*H04B 7/06* (2006.01)

(56) References Cited

OTHER PUBLICATIONS

Y. Bi, Y. Li and J. Wang, "3-D Printed Wideband Cassegrain Antenna With a Concave Subreflector for 5G Millimeter-Wave 2-D Multibeam Applications," in IEEE Transactions on Antennas and Propagation, vol. 68, No. 6, pp. 4362-4371, Jun. 2020, doi: 10.1109/TAP.2020.2972630 (Year: 2020).*

Lian, et al., "SIW Folded Cassegrain Lens for Millimeter-Wave Multibeam Application", IEEE Antennas and Wireless Propagation Letters, vol. 17, Issue: 4, pp. 583-586, 2018.

Bi, et al., "3D-Printed Wideband Wide-Angle Multi-Beam Planar Cassegrain Antenna for 5G Millimeter-Wave Applications", 2021 IEEE International Workshop on Electromagnetics: Applications and Student Innovation Competition (iWEM), 2021.

* cited by examiner

Fig.3
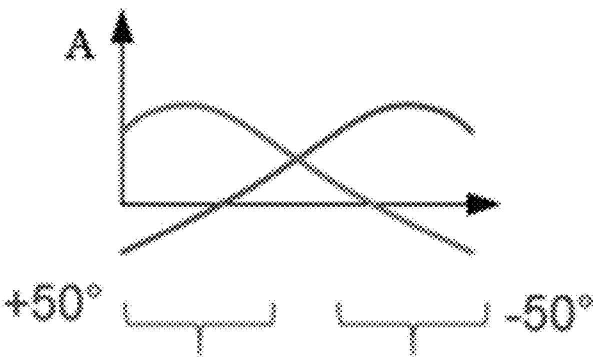
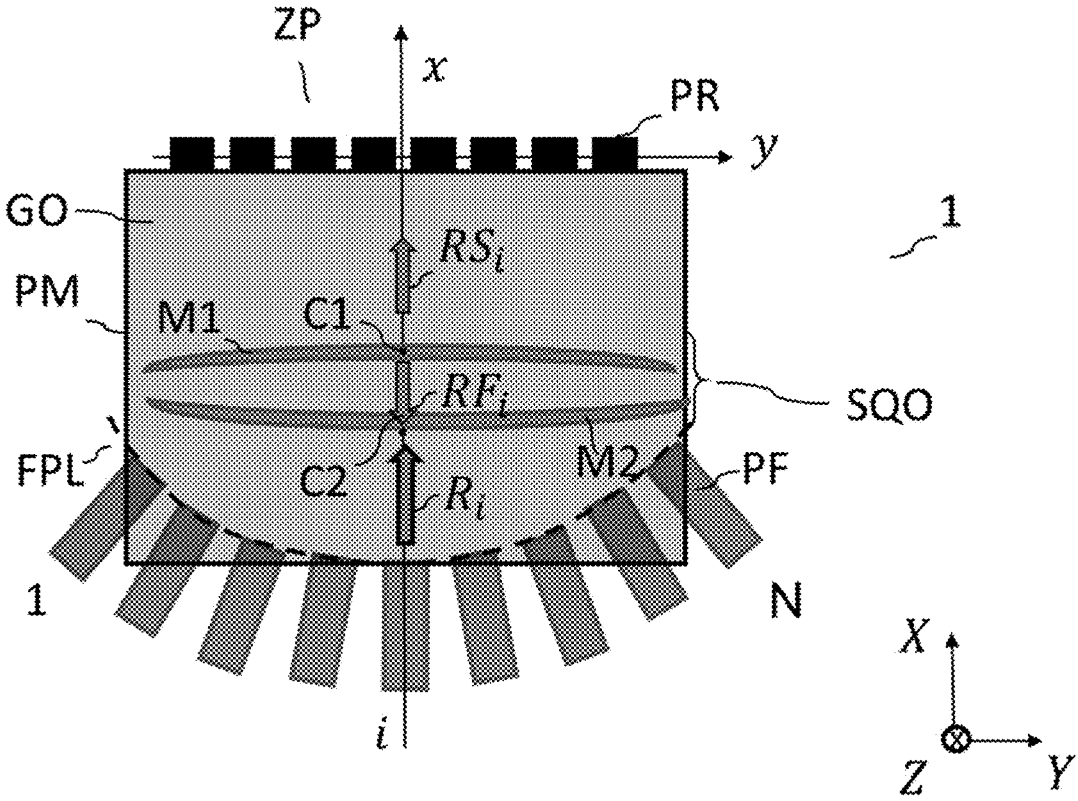
Fig.4

QUASI-OPTICAL BEAMFORMER COMPRISING TWO REFLECTORS

CROSS-REFERENCE TO RELATED APPLICATION

This application claims priority to foreign French patent application No. FR 2210515, filed on Oct. 13, 2022, the disclosure of which is incorporated by reference in its entirety.

FIELD OF THE INVENTION

The invention generally relates to the field of telecommunications, and in particular to quasi-optical beamformers (QOBF) for multibeam active antennas.

BACKGROUND

Quasi-optical beamformers may be installed on board satellites or in ground stations. Antennas using such formers may operate in transmission mode or in reception mode, reciprocally.

A quasi-optical beamformer is a focusing (reception mode) and collimating (transmission mode) device. FIG. 1 shows a prior-art quasi-optical beamformer applicable for example to pillbox, Rotman-lens or continuous-delay-lens beamformers. A quasi-optical beamformer conventionally incorporates a parallel-plate guide 16, linking beam ports 17 and network ports 18. The parallel-plate waveguide 16 makes it possible for waves to be guided in TEM mode (TEM being the acronym of Transverse ElectroMagnetic), in which mode the electric field E and the magnetic field H vary in directions perpendicular to the direction of propagation X.

The wavefronts are curved in the XY-plane. In order to compensate for the curvature of the wavefront, a quasi-optical device 23 is inserted between the beam ports and the network ports. This quasi-optical device may for example be a lens such as used in continuous-delay-lens beamformers or a reflector such as used in pillbox beamformers. Each network port 18 is connected to an amplifier 19 followed by a radiating element 20 by way of a delay line 21 and of an amplifier port 22. It converts the cylindrical waves emanating from the beam ports into plane waves that are radiated by the radiating panel of the multibeam active antenna.

QOBFs for active antennas are devices that are applied to low-level signals. Amplification is integrated between the QOBF and the radiating elements. Moderate losses are then acceptable.

The aim of the beamformers is to generate the phase and amplitude laws required to form the beams in the desired directions with low levels of sidelobes. FIG. 2 thus shows examples of these laws for three beams numbered 1, i and N. It shows the variations in the desired phase laws required to direct the beams in the desired directions. It also shows an apodized amplitude law used to obtain low levels of sidelobes in the radiation patterns. It will be noted that, in these three examples, the amplitude law is stable and centred on the centre of the lens and all the amplifiers are fed so as to benefit from a good radiation efficiency. These features must be respected during design of an active antenna if the need to oversize the antenna is to be avoided.

Specifically, in the case where the amplitude law is dependent on pointing direction as illustrated in FIG. 3, the radiating panel of the antenna must be oversized in order to be able to follow the displacement of the amplitude law with pointing direction. As a result, for each pointing direction, one portion of the array of radiating amplifiers is not fed, thus causing a decrease in the efficiency of the antenna.

Known quasi-optical beamformers able to operate over a wide angular sector unfortunately do not have a stable amplitude law. Use over a wide angular sector is necessary in many applications (particularly satellite applications). Their use in beamformers for active antennas thus leads to low antenna radiation efficiencies and to cost overheads due to the need to provide additional front-end circuits. These are major drawbacks of their use in active antennas.

Currently, none of the known QOBFs allows an angular sector larger than +/−50° to be covered with an amplitude law at the output of the optical device that remains stable over the covered angular sector.

SUMMARY OF THE INVENTION

The invention aims to overcome certain problems of the prior art. To this end, one subject of the invention is a quasi-optical beamformer comprising a plurality of power feeds, each configured to emit a radio-frequency beam guided in a radio-frequency waveguide, and comprising two reflectors coupled to the waveguide. The reflectors are configured to generate output radio-frequency beams taking plane-wave form, and to obtain a substantially identical transverse amplitude distribution at the output of the quasi-optical beamformer. The use of two particularly configured reflectors allows the beamformer to be made very compact while ensuring optimized operation over a wide angular range. Furthermore, the beamformer makes it easy to control the size of the exit region in which the network ports configured to collect radio-frequency radiation are located. These features make the beamformer of the invention particularly suited to being combined with a radiating panel to form a planar active antenna.

To this end, one subject of the invention is a quasi-optical beamformer comprising:

- a plurality N>1 of power feeds, each of the $i\in[1; N]$ power feeds being configured to emit a respective radio-frequency beam denoted $R_i$,
- a parallel-plate radio-frequency waveguide that extends along a central main axis, denoted axis x, and that is fed at a first end by the power feeds, a plurality of network ports being arranged at a second end of the radio-frequency waveguide to collect radio-frequency radiation, the radio-frequency waveguide comprising at least two metal plates stacked so as to guide the radio-frequency beams $R_i$, $i\in[1; N]$ to the network ports,
- a quasi-optical system that has a focal plane and that comprises a first reflector having a first centre centred on the axis x and a first effective radius of curvature and being configured to reflect the guided radio-frequency beams $R_i$, $i\in[1; N]$, and that comprises a second reflector having a second effective radius of curvature and being configured to reflect the radio-frequency beams reflected by the first reflector so as to direct them towards the network ports and form output radio-frequency beams,
- the first and second effective radii of curvature and an arrangement of the power feeds being configured so that each of the output radio-frequency beams is a plane wave, and so that a transverse amplitude distribution $A_i$, on the network ports, of each output radio-frequency beam is substantially identical.

According to one embodiment of the invention, a distance between a focal centre of each power feed and the first centre is smaller than a usable dimension the first reflector divided by two.

According to one embodiment of the invention, a direction of propagation of the radio-frequency beams $R_i$, i∈[1; N] and the first and second effective radii of curvature are configured so that at least one of the output radio-frequency beams propagates with an angle larger than 45° and preferably 55° with respect to the axis x.

According to one embodiment of the invention, the power feeds are arranged so that each of the radio-frequency beams $R_i$, i∈[1; N] partially irradiates the first and second reflectors in a region different from that of the other radio-frequency beams.

According to one embodiment of the invention, a transverse dimension of a region formed by the set of all the network ports, which region is called the sampling region, is smaller than a maximum dimension of the first and second reflectors.

According to one embodiment of the invention, the power feeds are superposed in at least two tiers, each of the at least two tiers being separated by a conductive plane common to two adjacent tiers, the quasi-optical beamformer comprising a resistive film arranged in the continuity of the conductive plane.

According to one embodiment of the invention, a focal centre of each power feed is arranged in the focal plane of the quasi-optical system.

According to one preferred embodiment of the invention, the beamformer of the invention is produced using a multilayer printed circuit board. Preferably, the multilayer printed circuit board comprises at least three stacked layers, the three stacked layers being metallized or partially metallized so as to form the radio-frequency waveguide, the waveguide comprising first, second and third stacked segments, the first reflector being arranged to reflect the radio-frequency beams $R_i$, i∈[1; N] guided in the first segment towards the second segment, and the second reflector being arranged to reflect the radio-frequency beams $R_i$, i∈[1; N] guided in the second segment towards the third segment.

Preferably, in the preferred embodiment, the first and second reflectors each comprise metal strips deposited on a metallized face of the multilayer circuit board, a height and arrangement of the strips being configured so that the first and second reflectors have the first and second effective radii of curvature, respectively. Alternatively, according to another embodiment, the reflectors are produced with contactless transitions between a plurality of layers of the radio-frequency waveguide.

According to one embodiment of the invention, the beamformer of the invention comprises a number of reflectors higher than two, the reflectors being arranged so as to successively reflect the radio-frequency beams $R_i$, i∈[1; N] and to collimate them.

Another subject of the invention is a planar active antenna comprising:

- at least one beamformer according to the invention,
- delay lines, each connected to a respective one of the network ports at a proximal end and to a power-amplifying device at a distal end, the power-amplifying device being configured to amplify a radio-frequency signal collected by the respective beam port,
- radiating elements each connected to a respective power-amplifying device and configured to transmit a radio-frequency wave based on the radio-frequency signal amplified by the respective power-amplifying device.

According to one embodiment of the antenna of the invention, the delay lines each have an electrical length different from the others.

BRIEF DESCRIPTION OF THE DRAWINGS

Other features, details and advantages of the invention will become apparent on reading the description given with reference to the appended drawings, which are given by way of example and which show, respectively:

FIG. 3 an example of the dependency of an amplitude law on pointing direction;

FIG. 4 a schematic view of a quasi-optical beamformer according to the invention;

In the figures, unless otherwise indicated, the elements have not been drawn to scale.

DETAILED DESCRIPTION

FIG. 4 schematically illustrates a quasi-optical beamformer 1 according to the invention, which mainly comprises a plurality N>1 of power feeds PF, a parallel-plate radio-frequency waveguide GO and a plurality of network ports PR.

In the quasi-optical beamformer 1 according to the invention, each of the i∈[1; N] power feeds PF is configured to emit a respective radio-frequency beam denoted $R_i$. According to one embodiment of the invention, each radio-frequency beam $R_i$ is generated by a plurality of feeds.

According to one embodiment of the invention, the feeds are horn antennas, for example H-plane horn antennas, which are particularly well suited to beam reconfiguration because each power feed can define one spot-beam. In addition, horn antennas are able to be easily designed and manufactured in PCB technology (PCB standing for Printed Circuit Board).

According to another embodiment, the feeds are other types of feeds well known to those skilled in the art, for example monopole arrays, transitions between microstrip lines and parallel-plate guides, transitions between striplines and parallel-plate guides, etc.

The parallel-plate radio-frequency waveguide GO extends along a central main axis denoted axis x and is fed at a first end by the power feeds PF. As will be explained in the description of FIG. 10, preferably all or some of the parallel-plate radio-frequency waveguide GO is designed and manufactured in PCB technology to improve the compactness of the beamformer 1.

Figure 11:
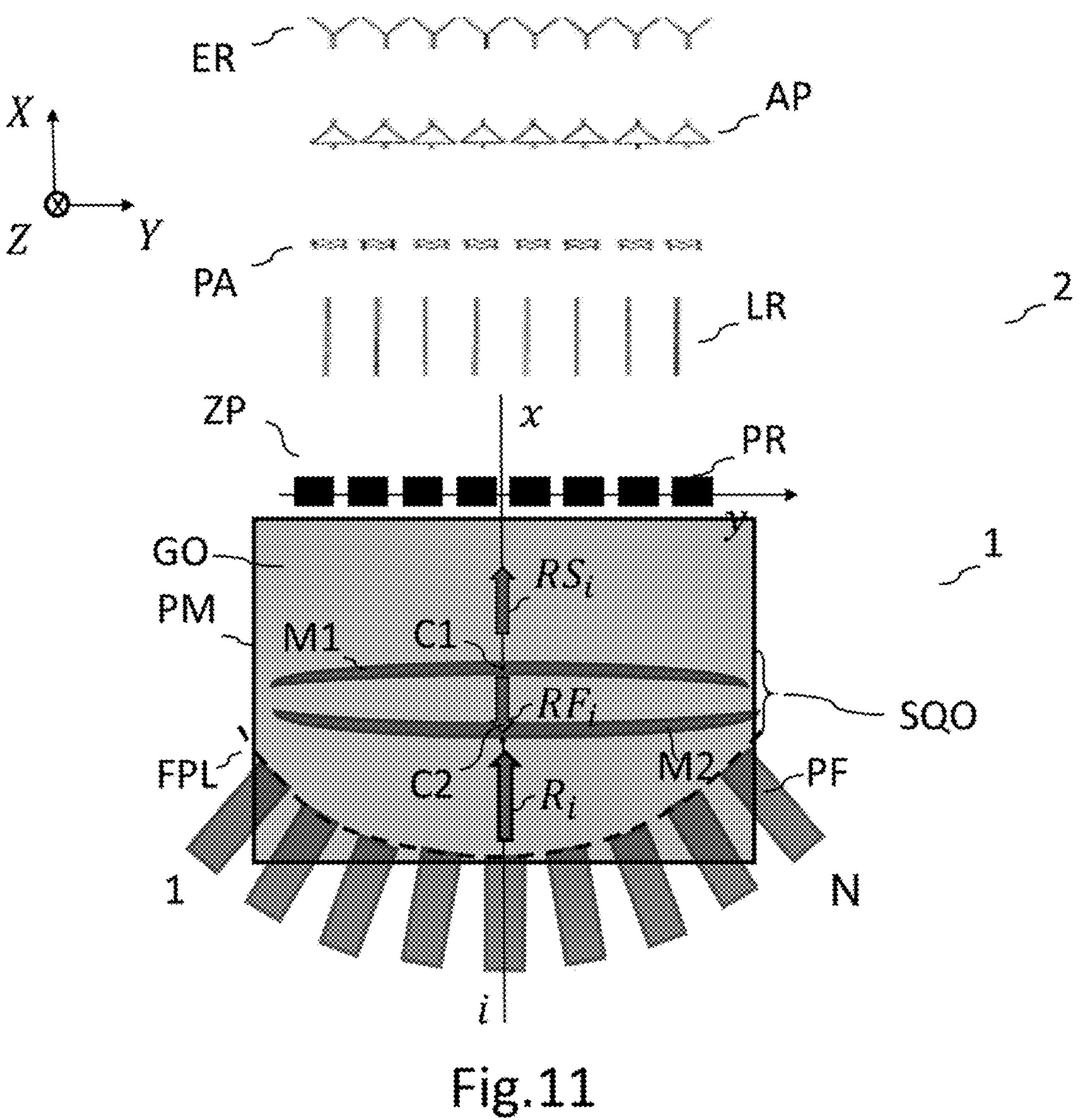
FIG. 11 a schematic view of an active antenna according to the invention comprising at least one beamformer according to the invention.

The network ports PR are arranged at a second end of the waveguide GO so as to collect radio-frequency radiation and potentially allow the beamformer 1 to be coupled to a radiating panel in order to form an active antenna (see FIG. 11).

The waveguide GO comprises at least two metal plates PM that are stacked to guide the radio-frequency beams $R_i$, i∈[1; N] to the network ports PR. Below, the region formed by the spatial distribution of the network ports PR is referred to as the "sampling region ZP". By way of non-limiting example, in FIG. 4, this sampling region is a straight line segment in the direction y perpendicular to the axis x and the parallel plates PM extend as XZ-planes.

The power feeds PF are configured to generate a TEM wave or a TE wave or indeed both in the waveguide GO.

Figure 10:
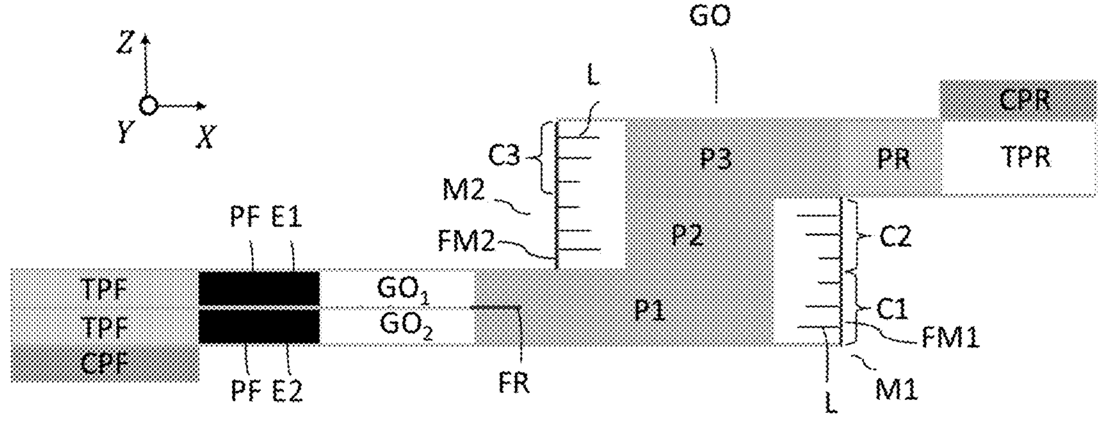
FIG. 10 a schematic view of one embodiment of the invention in which the beamformer is produced using a multilayer printed circuit board.

In the embodiment illustrated in FIG. 4, the metal plates PM extend as XZ-planes and are therefore superposed in the Y-direction. As illustrated in FIG. 10 for example, the waveguide GO may comprise a plurality of pairs of plates, the pairs being stacked over all or some of their extent, so as to form stacked segments of the waveguide GO.

Furthermore, the beamformer comprises a quasi-optical system SQO configured to collimate the radio-frequency beams $R_i$, i∈[1; N]. For this purpose, the quasi-optical system SQO comprises a first reflector M1 and a second reflector M2. The first reflector M1 has a first centre C1 centred on the axis x and a first effective radius of curvature and is configured to reflect the radio-frequency beams $R_i$, i∈[1; N] guided in the parallel-plate waveguide GO. The second reflector M2 has a second effective radius of curvature and is configured to reflect the radio-frequency beams $RF_i$, i∈[1; N] reflected by the first reflector so as to direct them towards the network ports and form output radio-frequency beams $RS_i$, i∈[1; N].

In the beamformer 1, the reflectors M1 and M2 (in particular via the first and second effective radii of curvature) and the arrangement of the power feeds PF are configured so that:

- each of the output radio-frequency beams $RS_i$, i∈[1; N] is a plane wave, and
- so that the transverse amplitude distribution $A_i$ of each output radio-frequency beam $RS_i$, i∈[1; N] on the network ports PR is substantially identical.

By "substantially identical transverse amplitude distribution $A_i$" what is meant here is that the individual excitation of each of the feeds PF leads to amplitudes of the signals received by each of the network ports PR of the sampling region ZP varying over a dynamic range of less than or equal to 3 dB between each of these feeds.

The profile of the reflectors M1 and M2 is optimized using a physical-optics ray-tracing software package developed by the inventors. In this optimization, each reflector is defined by a spline, itself defined by "nodes". By "spline" what is meant is a function defined piecewise by polynomials. During the iterative optimization process, it is these "nodes" that are moved and consequently modify the contour of the reflectors. The movement of these "nodes" is dictated by the local phase difference between the phase law desired in the sampling region and the current phase law of the system in the iterative process.

Other parameters taken into account in the overall optimization of the quasi-optical system:

- the position of the PF feeds;
- the orientation of the PF feeds;
- their orientation about their phase centres;
- the width of the feeds;
- the width of the quasi-optical system;
- the gap between the two reflectors.

The use of two particularly configured reflectors M1, M2 allows the beamformer to be made very compact while ensuring optimized operation over a wide angular range. The compactness of the device of the invention is made possible because the feeds PF are able to be placed close to the centre C1, because a quasi-optical system SQO comprising at least two reflectors is used. Specifically, the use of two (or more) reflectors allows the distance between the focal plane FPL and the first centre C1 to be decreased, with respect to the case of a single reflector of same centre C1.

In addition, to the first order, the reflectors of the optical system SQO are configured so that an angle between the axis x and the direction of propagation of the output beams RS; is equal to an angle between the focal centre of the feeds PF and the first centre C1. It is also possible to control the angular coverage of the beamformer 1 via the arrangement of the feeds PF.

According to one preferred embodiment, the direction of propagation of the radio-frequency beams output from each feed PF and the first and second effective radii of curvature are configured so that the beamformer 1 possesses an angular coverage greater than 45° and preferably 55°. By "angular coverage of θ" what is meant here is that the beamformer 1 is configured to emit output beams $RS_i$ propagating with an angle ranging from +θ° to −θ° with respect to the axis x. The use of an angular coverage greater than 50°, for example, is desirable in many applications, in particular LEO-satellite applications.

Preferably, as illustrated in FIG. 4, the focal centre of each power feed PF is arranged in the focal plane FPL of the quasi-optical system SQO in order to guarantee optimum collimation by the system SQO.

Preferably, the reflectors and the arrangement of the power feeds PF are configured so that the transverse amplitude distribution of an output beam $RS_i$ in the sampling region ZP follows an apodized law, this allowing the main lobe of this beam to be widened and the sidelobes associated with this beam to be decreased.

Figure 1:
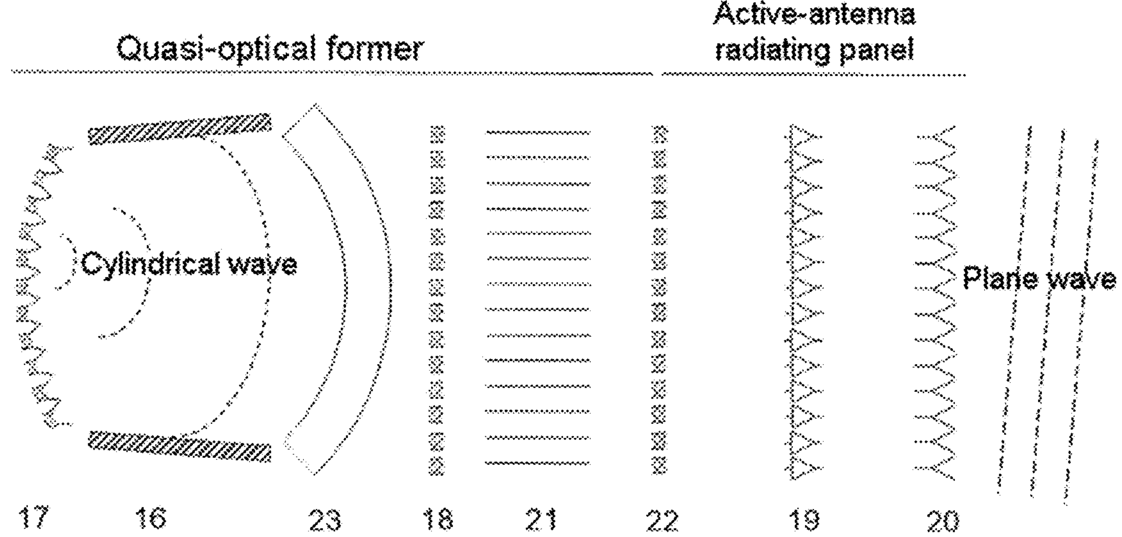
FIG. 1 a schematic view of a prior-art quasi-optical beamformer.
Figure 1:
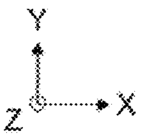
Figure 2:
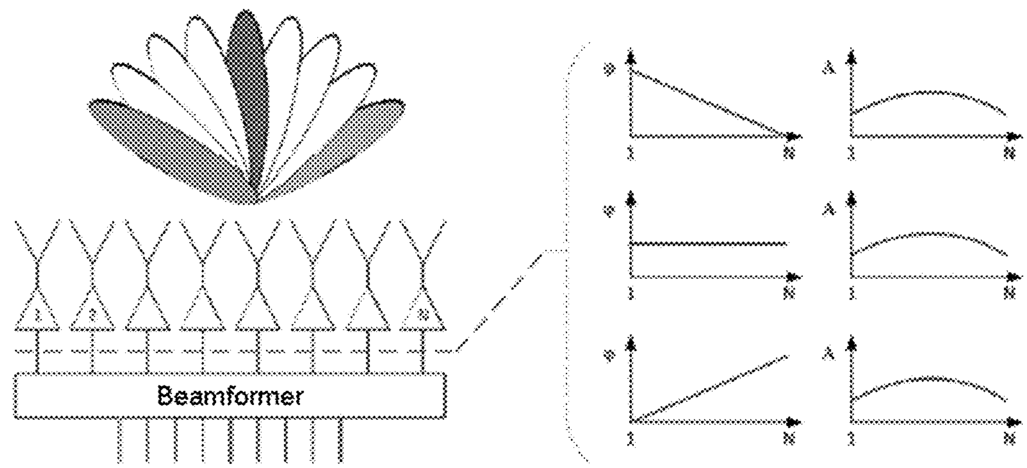
FIG. 2 phase and amplitude laws required to form beams in a plurality of directions with low sidelobe levels.
Figure 5:
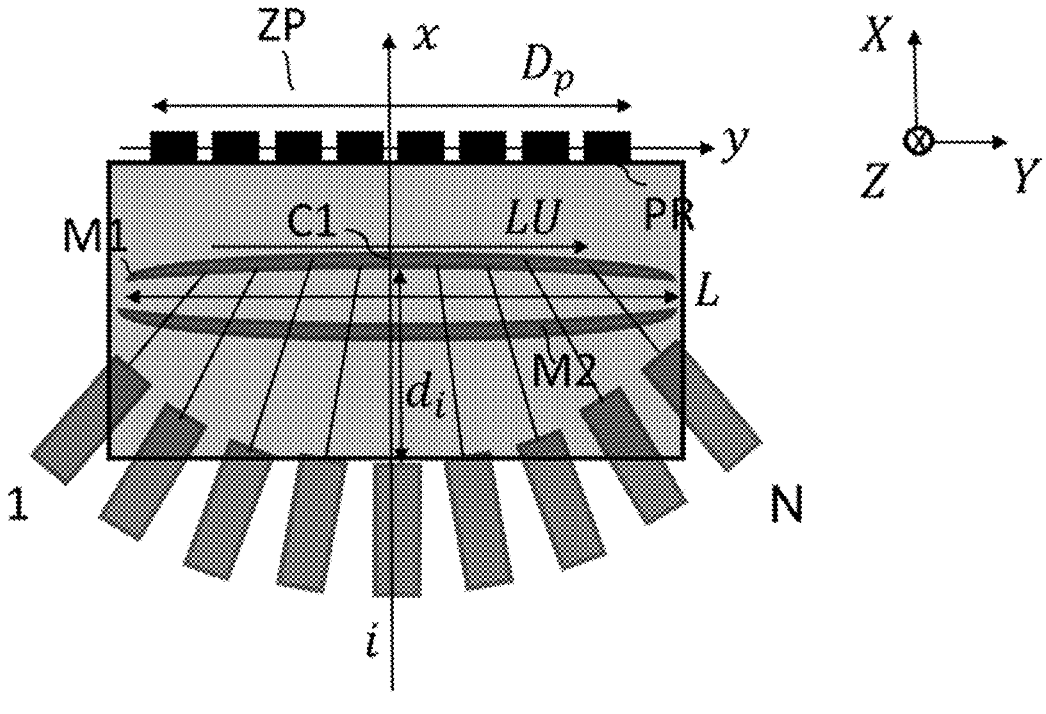
FIG. 5 a schematic view of a quasi-optical beamformer according to one embodiment of the invention.

FIG. 5 schematically illustrates one preferred embodiment of the invention in which, in order to facilitate optimization of the profile of the reflectors, the power feeds PF are arranged so that each of the beams $R_i$, i∈[1; N] partially irradiates the reflectors in a region different from that of the other beams. This allows the degrees of freedom in the design of the reflectors to be increased with a view to optimization of the parameters of the various angular directions. It is then possible to obtain better control of sidelobe level over a wide angular sector while ensuring that the condition on the amplitude distribution in the sampling region is met. In FIG. 5 only the central axis of propagation of the beams $R_i$ has been shown. It will be understood that in fact there may be a partial overlap between certain of the reflector regions irradiated by the beams $R_i$, i∈[1; N].

The reference LU in FIG. 5 corresponds to the maximum dimension of the zone formed by the sum of the regions of the reflector M1 irradiated by the beams $R_i$, i∈[1; N]. This maximum dimension is referred to as the usable dimension LU below. According to one embodiment, in order to ensure satisfactory compactness while maintaining optimum operation of the quasi-optical system SQO, in the beamformer 1, the distance $d_i$ between a focal centre of each i∈[1; N] power feed PF and the first centre $C_1$ is smaller than a usable dimension LU of the first reflector divided by two.

According to the embodiment illustrated in FIG. 4 and in FIG. 5, the quasi-optical system SQO comprises only two reflectors M1, M2. This allows a satisfactory angular coverage to be obtained while maintaining an advantageous compactness.

Alternatively, according to another embodiment, the quasi-optical system SQO comprises a number of reflectors higher than two, the reflectors being arranged so as to successively reflect the radio-frequency beams $R_i$, i∈[1; N] and to collimate them. Compared with only two reflectors, the use of a number of reflectors higher than two allows the angular coverage of the beamformer 1 to be increased. In addition, this allows the degrees of freedom of optimization of the effective radius of curvature of each reflector to be increased, thus ensuring equal transverse amplitude distributions $A_i$ on the network ports for any i∈[1; N]. It will be understood that this complicates design and manufacture of the beamformer 1.

Preferably, via the arrangement of the feeds PF with respect to the reflectors and optimization of the reflectors, phase aberrations in the output beams $RS_i$ are decreased to less than λ/10, and preferably less than λ/8. Here, λ is the central wavelength for which the beamformer 1 is optimized. A phase aberration of less than λ/10 is desirable to reduce pointing errors and sidelobe level.

Preferably, the first and second reflectors are configured so that the transverse amplitude distribution $A_i$ of each output radio-frequency beam $RS_i$ i∈[1; N] has a maximum amplitude variation in the sampling region equal to 6 dB±1 dB. A variation of 6 dB allows sidelobes to be rejected at a satisfactory value (17 dB or less of the maximum amplitude) without oversizing the active antenna comprising the beamformer of the invention. Specifically, assuming the transverse amplitude distribution $A_i$ is configured, a variation greater than 6 dB would allow the sidelobes to be further decreased but would have the consequence of requiring the size of the antenna to be increased to obtain the same antenna gain.

According to one preferred embodiment of the invention, the sampling region ZP formed by the network ports PR has a transverse dimension $D_p$ smaller than a maximum dimension of the reflectors. In the embodiment of FIG. 5, the network ports PR are aligned in the direction y with an alignment length $D_p$ and the reflectors M1, M2 have a length (maximum dimension) of dimension $L>D_p$. The ability to decrease the size of the sampling region is particularly advantageous in active-antenna applications as it makes it possible to avoid the need to oversize the radiating elements and therefore overdimension the antenna gain. In the invention, it is possible to decrease the size of the sampling region without in any way degrading operation of the beamformer over the entirety of the angular coverage.

By way of non-limiting example, according to one embodiment, the reflectors M1, M2 have a length of dimension L=21λ and the beamformer 1 comprises 26 network ports PR that are aligned side by side in the direction y, each network port PR having a width of 0.6λ. Thus, the alignment formed by the network ports has an alignment length $D_p$=16λ. Network ports having a width of 0.6λ or less than 0.6λ are preferred to decrease spurious reflections of large angles of incidence.

Figure 6A:
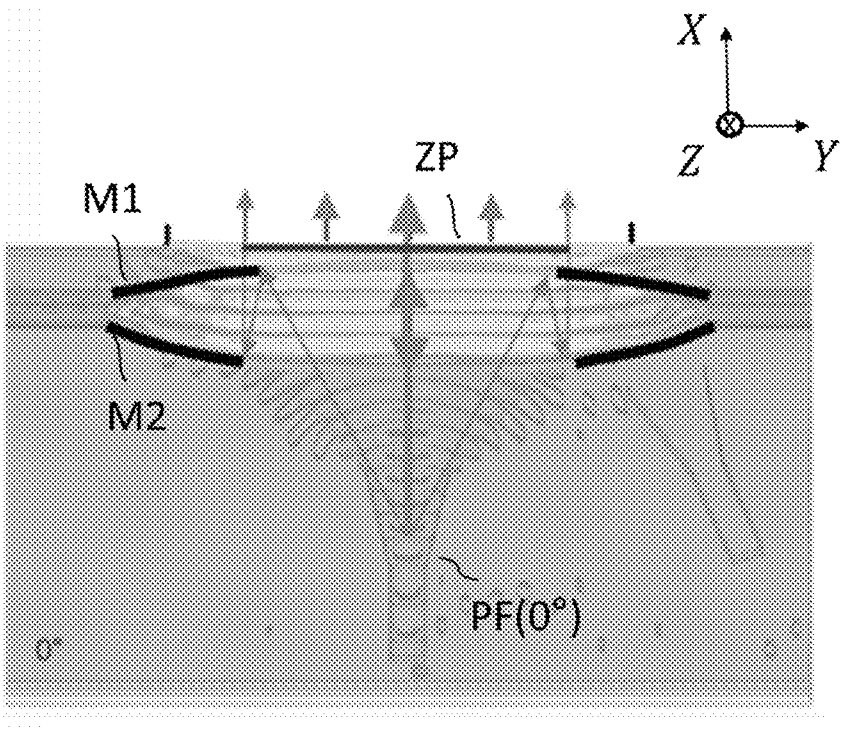
FIG. 6A and FIG. 6B the path of the output radio-frequency beam propagating with an angle of 0° and of 54° in a beamformer according to one embodiment of the invention, respectively.
Figure 6B:
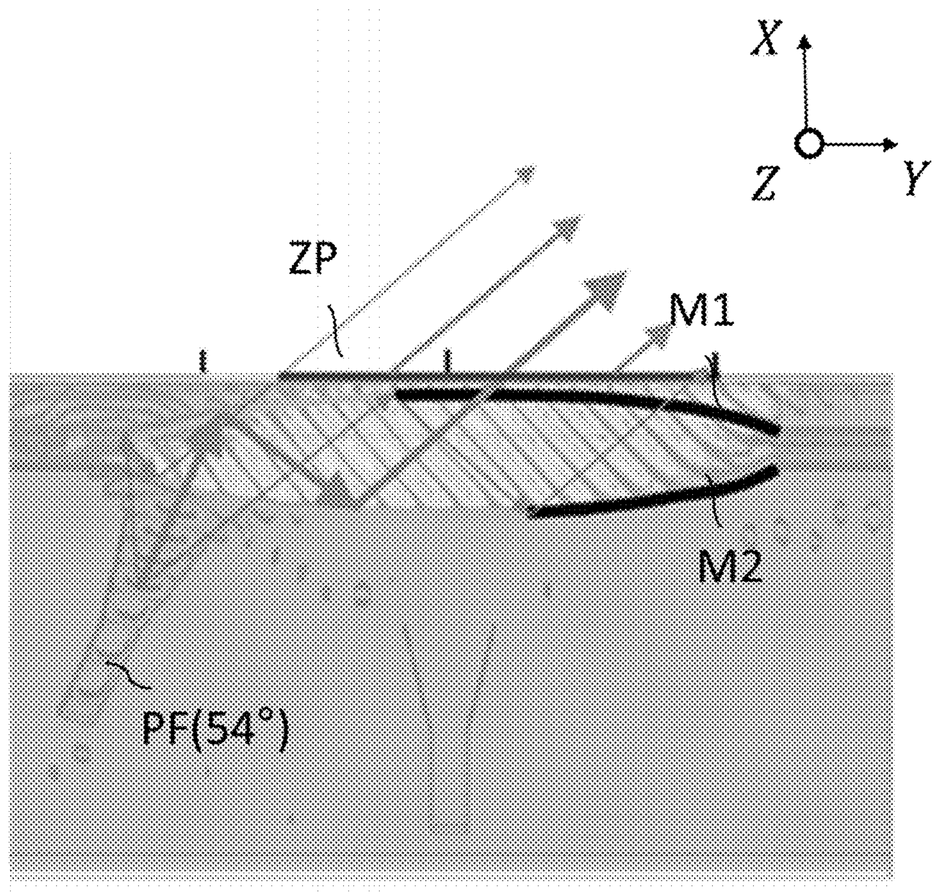

FIGS. 6A and 6B schematically illustrate the path of the output radio-frequency beam propagating with an angle of 0° ("0° beam" below) and of 54° ("54° beam" below) in a beamformer 1 according to an embodiment of the invention comprising only a first and a second reflector M1, M2, respectively. By way of non-limiting example, the network ports PR are aligned in the sampling region ZP, side by side, in the direction y. In FIGS. 6A and 6B, it may be seen that the 0° beam does not irradiate the same region of the reflectors M1, M2 or the same zone of the sampling region ZP as the 54° beam. As explained above, this allows the parameters of the 0° and 54° beams (for example the decrease in the sidelobes or the amplitude distribution in the sampling region) to be optimized separately and more easily.

Figure 6C:
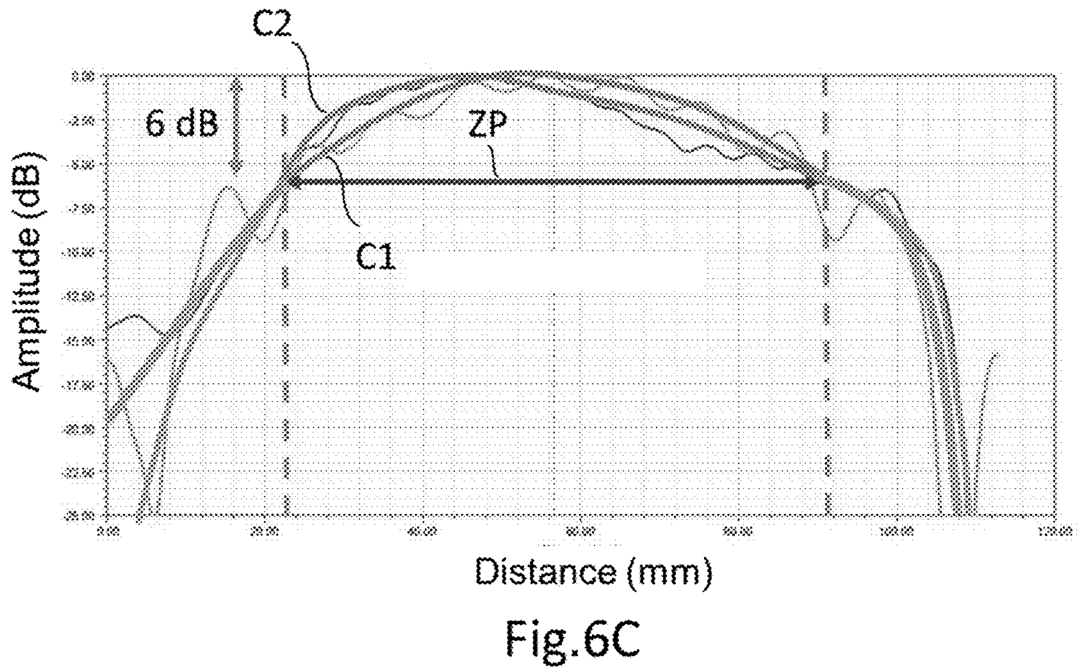
FIG. 6C a graph showing the distribution, in the sampling region, of the amplitude of the normalized field of the 0° beam (curve C1) and −54° beam (curve C2) in the beamformer according to the embodiment of FIGS. 6A and 6B.

FIG. 6C is a graph showing the distribution, in the sampling region, of the amplitude of the normalized field of the 0° beam (curve C1) and −54° beam (curve C2) in the beamformer 1 according to the embodiment of FIGS. 6A and 6B. Having regard to the geometry of FIGS. 6A and 6B, this amplitude distribution corresponds to a profile in the direction Y in the sampling region ZP. It may be seen in FIG. 6C that the amplitude distribution of the 0° and −54° beams is substantially identical in the sampling region ZP, the 0° and −54° beams perfectly irradiating the network ports, with an apodized law, this allowing the main lobe of each beam to be widened and the sidelobes associated with these beams to be decreased. In addition, it will be noted that the two output beams each have a maximum amplitude variation in the sampling region equal to 6 dB.

Figure 7:
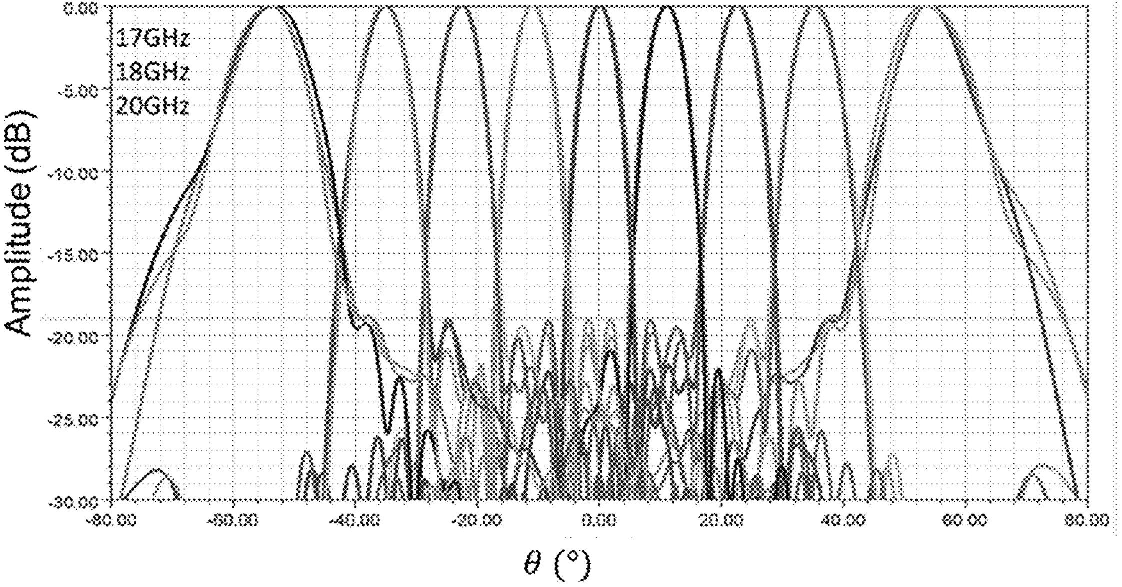
FIG. 7 the radiation pattern of the beamformer of the embodiment of FIGS. 6A to 6C for output beams $RS_i$ having a different angle θ and at three different central frequencies generated by the feeds PF: 17 GHz, 18 GHz and 20 GHz.

FIG. 7 illustrates the radiation pattern of the beamformer 1 of the embodiment of FIGS. 6A to 6C for output beams $RS_i$ having an angle θ with respect to the axis X of ±55°, ±35°, ±22.5°, ±10° and 0° (and each associated with a respective feed PF) and at three different central frequencies generated by the feeds PF: 17 GHz, 18 GHz and 20 GHz;

First of all, it may be seen that the levels of the sidelobes are low (about −20 dB with respect to the maximum gain) at all three central frequencies. However, it will be noted that the beamformer 1 produces output beams $RS_i$ that intersect at a low gain level (approximately −15 dB with respect to the maximum gain).

Figure 8:
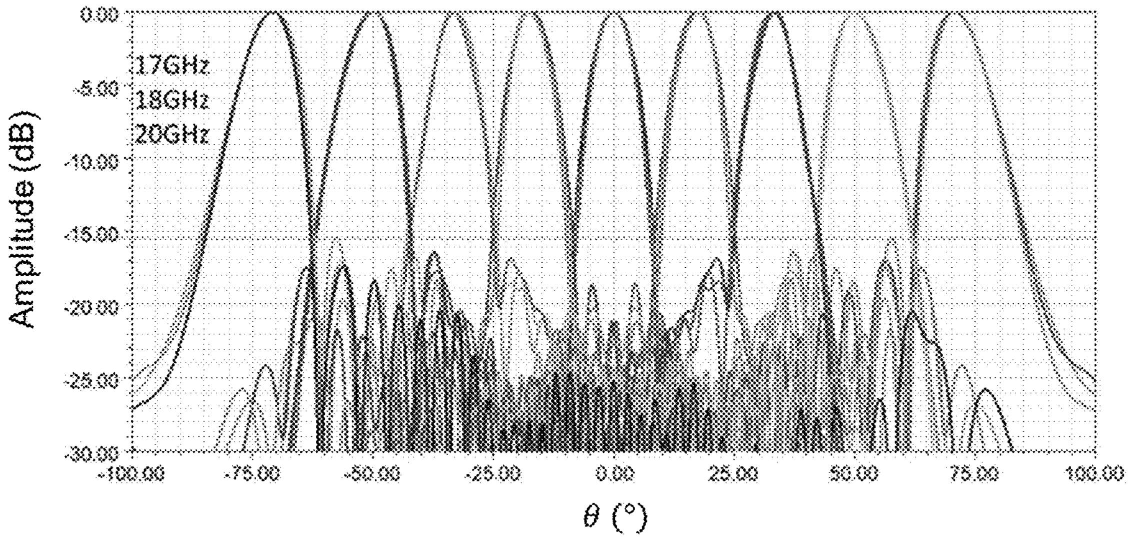
FIG. 8 the radiation pattern of the beamformer according to one embodiment of the invention for output beams $RS_i$ having a different angle θ and at three different central frequencies generated by the feeds PF: 17 GHz, 18 GHz and 20 GHz.

FIG. 8 illustrates the radiation pattern of the beamformer 1 according to an embodiment with two reflectors that is different from that of FIGS. 6A to 7. Due to an optimization of the profile of the reflectors M1, M2 different from that of the reflectors of FIGS. 6A to 7, the beamformer of FIG. 8 has an angular coverage of ±70°. The radiation pattern is shown for the same three central frequencies as shown in FIG. 7, and for beams having an angle θ with respect to the axis X of ±70°, ±50°, ±32.5°, ±17.5° and 0°. Just as in FIG. 7, in FIG. 8 it may be seen that the levels of the sidelobes are low (about −16 dB with respect to the maximum gain) at all three central frequencies. Just as in FIG. 7, it will be noted that the beamformer 1 produces output beams $RS_i$ that intersect at a low gain level (approximately −15 dB with respect to the maximum gain).

As illustrated in FIGS. 7 and 8, the beamformer 1 produces output beams $RS_i$ that intersect at a low gain level. This level of intersection of the beams is a result of a compromise in respect of the size of the feeds: on the one hand, they must be large enough to adequately irradiate the quasi-optical system SQO and thus avoid spill-over losses, and on the other hand, they must be close together enough for the output beams $RS_i$ to overlap.

Figure 9:
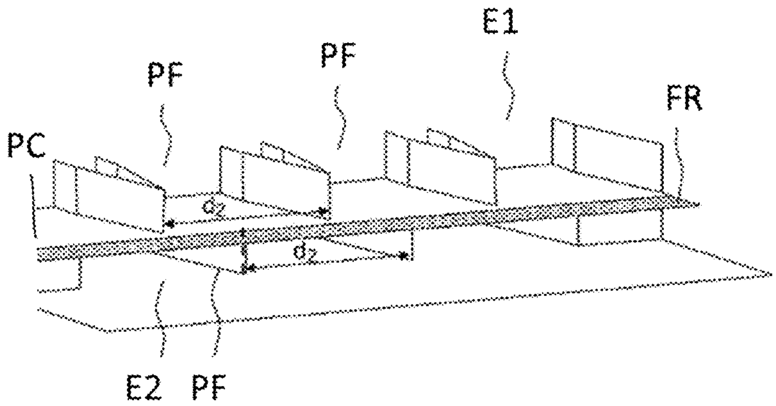
FIG. 9 a schematic view of an arrangement of the power feeds in one embodiment of the invention.

To overcome this problem, according to one embodiment illustrated in FIG. 9, the power feeds PF are superposed in at least two tiers E1 and E2, each of the at least two tiers being separated by a conductive plane PC common to two adjacent tiers, the quasi-optical beamformer comprising a resistive film FR arranged in the continuity of the conductive plane. As illustrated in FIG. 9, the feeds PF of the upper tier E1 and the feeds PF of the tier E2 may be offset with respect to one another in the focal plane FPL of the quasi-optical system SQO. By way of non-limiting example, in the illustration of FIG. 9, the feeds PF of the tier E1 and the feeds PF of the tier E2 are offset by a distance $d_2/2$ (with $d_2$ the width of one feed PF), and the focal centre of a feed of the upper tier E1 coincides with the junction between two feeds of the lower tier E2, and vice versa.

The presence of the resistive film in the continuity of the conductive plane allows losses associated with the intersection of the beams to be minimized while increasing the density of the feeds PF. This therefore allows the angular resolution of the beams $R_i$ to be increased and thus makes it possible to avoid obtaining a beamformer that generates angularly separate beams that intersect at very low levels. The resistive film makes it possible, inter alia, to use feeds PF of larger sizes, this also making it possible to limit the amplitude of the field on the edges of the beamformer 1 and therefore to limit spurious reflections from these edges.

The resistive film FR makes it possible to isolate the feeds of the lower tier E1 from the feeds of the tier E2 and to obtain, at the output port common to the two tiers, which is located in the waveguide GO, lossless summation of the signals delivered by the input beam ports when said signals are in phase and of the same amplitude.

FIG. 10 illustrates one embodiment of the invention in which the beamformer is produced using a multilayer printed circuit board. This embodiment has the advantage of having greatly improved compactness. The multilayer printed circuit board comprises at least three layers Cl1, Cl2, Cl3 stacked in the direction Z. The three stacked layers are metallized or partially metallized so as to form the parallel-plate radio-frequency waveguide GO. More precisely, the waveguide comprises first, second and third segments P1, P2 and P3 that are stacked in the direction Z and that are arranged so that the main direction of the waveguide GO extends along the axis x.

In the embodiment of FIG. 10, the first reflector is arranged so as to reflect the radio-frequency beams $R_i$ guided in the first segment P1 towards the second segment P2. In addition, the second reflector is arranged so as to reflect the radio-frequency beams $R_i$ guided in the second segment towards the third segment.

The multilayer printed circuit board of FIG. 10 further comprises transitions TPF that are configured to connect the feeds PF to feed connectors CPF, and transitions TPR configured to connect the network ports to network-port connectors CPR.

Optionally, as illustrated in FIG. 10, the feeds PF are superposed in at least two tiers E1 and E2. In addition, the multilayer printed circuit board comprises two parallel-plate waveguides GO1, GO2 that are superposed in the direction Z, each of the superposed parallel-plate waveguides GO1, GO2 being arranged facing the feeds PF of a respective tier in order to guide the radiation emitted by these feeds. The waveguide GO is thus arranged in the continuity of the superposed parallel-plate waveguides GO1, GO2. Lastly, the resistive film FR is arranged at the junction between each superposed parallel-plate waveguide and the waveguide GO, in order to minimize losses associated with intersection of the beams while increasing the density of the feeds PF.

In the embodiment of FIG. 10, the reflectors M1, M2 each comprise metal strips L that are deposited on one metallized face of the multilayer circuit board (metallized faces referenced FM1 and FM2 in FIG. 10, respectively). In this embodiment, the height of each strip and its arrangement on its respective metallized face are configured to achieve the first and second effective radii of curvature, respectively. The position and height of each strip is preferably determined by software.

Alternatively, according to one variant of the embodiment of FIG. 10, the reflectors M1, M2 are produced with contactless transitions between a plurality of layers of the radio-frequency waveguide. The creation of a reflector with contactless transitions in a multilayer circuit board is described in the document FR 3 057 999.

FIG. 11 schematically illustrates an active antenna 2 according to the invention. The antenna 2 comprises at least one beamformer according to the invention and delay lines LR. Each of the delay lines LR is connected to a respective one of the network ports at a proximal end and to a power-amplifying device AP at a distal end by way of an amplifier port PA. The power-amplifying device AP is configured to amplify a radio-frequency signal collected by the respective beam port. Lastly, radiating elements ER are each connected to a respective power-amplifying device and are configured to transmit a radio-frequency wave based on the radio-frequency signal amplified by the respective power-amplifying device.

As explained above, the transverse dimension of the sampling region directly impacts the number of radiating elements able to be fed by the beamformer 1. This number of radiating elements is typically equal to the width in λ of the sampling region divided by about 0.6 (the network ports being separated by about 0.6λ to minimize spurious reflections at the edges of the beamformer 1).

It is thus important for the transverse dimension of this sampling region to be set consistently with the number of radiating elements of the antenna. A sampling region that is too large with respect to the desired number of radiating elements would lead to under-utilization of the energy output from the beamformer and thus generate additional losses.

According to one embodiment of the active antenna 2 of the invention, the delay lines each have an electrical length different from the others. Thus, the delay lines introduce an additional degree of freedom into the optimization of the reflectors to obtain a predetermined phase as output from the active antenna.

Although operation of the devices of the invention has been described in transmission, operation also transposes to reception. In this case, a parallel incident radio-frequency wave is collected and then transmitted to the network ports and is focused by the quasi-optical system SQO in a direction determined by the angle of propagation of the incident wave with respect to the axis x. Lastly, each of the power feeds PF is also configured to collect the radiation focused by the quasi-optical system SQO in a respective direction.

The invention claimed is:

1. A quasi-optical beamformer comprising:

a plurality N>1 of power feeds (PF), each of the i∈[1; N] power feeds (PF) being configured to emit a respective radio-frequency beam denoted $R_i$, a parallel-plate radio-frequency waveguide (GO) that extends along a central main axis, denoted axis x, and that is fed at a first end by the power feeds, a plurality of network ports (PR) being arranged at a second end of the radio-frequency waveguide (GO) to collect radio-frequency radiation, the radio-frequency waveguide (GO) comprising at least two metal plates (PM) stacked so as to guide the radio-frequency beams $R_i$, $i\in[1; N]$ to the network ports (PR), a quasi-optical system (SQO) that has a focal plane (FPL) and that comprises a first reflector (M1) having a first centre (C1) centred on the axis x and a first effective radius of curvature and being configured to reflect the guided radio-frequency beams $R_i$, $i\in[1; N]$, and that comprises a second reflector (M2) having a second effective radius of curvature and being configured to reflect the radio-frequency beams ($RF_i$) reflected by the first reflector so as to form output radio-frequency beams ($RS_i$) directed towards the network ports, the first and second effective radii of curvature and an arrangement of the power feeds (PF) being configured so that each of the output radio-frequency beams ($RS_i$) is a plane wave, and so that the individual excitation of each of the power feeds (PF) leads to a transverse amplitude distribution $A_i$, on the network ports (PR), of each output radio-frequency beam ($RS_i$) varying over a dynamic range of less than or equal to 3 dB between each of the power feeds.

2. The quasi-optical beamformer according to claim 1, wherein a distance between a focal centre of each power feed (PF) and the first centre is smaller than a usable dimension (LU) of the first reflector divided by two.

3. The quasi-optical beamformer according to claim 1, wherein a direction of propagation of the radio-frequency beams $R_i$, $i\in[1; N]$ and the first and second effective radii of curvature are configured so that at least one of the output radio-frequency beams ($RS_i$) propagates with an angle larger than 45° or with an angle larger than 55° with respect to the axis x.

4. The quasi-optical beamformer according to claim 1, wherein the power feeds (PF) are arranged so that each of the radio-frequency beams $R_i$, $i\in[1; N]$ partially irradiates the first and second reflectors in a region different from that of the other radio-frequency beams.

5. The quasi-optical beamformer according to claim 1, a transverse dimension ($D_P$) of a region formed by the set of all the network ports, which region is called the sampling region, is smaller than a maximum dimension of the first and second reflectors.

6. The quasi-optical beamformer according to claim 1, wherein the power feeds are superposed in at least two tiers, each of the at least two tiers being separated by a conductive plane common to two adjacent tiers, the quasi-optical beamformer comprising a resistive film arranged in the continuity of the conductive plane.

7. The quasi-optical beamformer according to claim 1, wherein a focal centre of each power feed (PF) is arranged in the focal plane of the quasi-optical system (SQO).

8. The quasi-optical beamformer according to claim 1, produced using a multilayer printed circuit board.

9. The quasi-optical beamformer according to claim 8, wherein the multilayer printed circuit board comprises at least three stacked layers (Cl1, Cl2, Cl3), the three stacked layers being metallized or partially metallized so as to form the radio-frequency waveguide, the waveguide comprising first, second and third stacked segments (P1, P2, P3), the first reflector being arranged to reflect the radio-frequency beams $R_i$, $i\in[1; N]$ guided in the first segment towards the second segment, and the second reflector being arranged to reflect the radio-frequency beams $R_i$, $i\in[1; N]$ guided in the second segment towards the third segment.

10. The quasi-optical beamformer according to claim 8, wherein the first and second reflectors each comprise metal strips (L) deposited on a metallized face (FM1, FM2) of the multilayer circuit board, a height and arrangement of the strips being configured so that the first and second reflectors have the first and second effective radii of curvature, respectively.

11. The quasi-optical beamformer according to claim 8, wherein the reflectors are produced with contactless transitions between a plurality of layers of the radio-frequency waveguide.

12. The quasi-optical beamformer according to claim 1, comprising a number of reflectors higher than two, the reflectors being arranged so as to successively reflect the radio-frequency beams $R_i$, $i\in[1; N]$ and to collimate said radio-frequency beams.

13. A planar active antenna comprising:

at least one beamformer according to claim 1, delay lines (LR), each connected to a respective one of the network ports at a proximal end and to a power-amplifying device (AP) at a distal end, the power-amplifying device being configured to amplify a radio-frequency signal collected by the respective network port, radiating elements (ER) each connected to a respective power-amplifying device and configured to transmit a radio-frequency wave based on the radio-frequency signal amplified by the respective power-amplifying device.

14. The planar active antenna according to claim 13, wherein the delay lines each have a different electrical length from the others.

* * * * *